United States Patent
Guo et al.

(10) Patent No.: US 10,762,018 B1
(45) Date of Patent: Sep. 1, 2020

(54) METHOD AND APPARATUS FOR INCREASING THE NUMBER OF USB ROOT HUB PORTS

(71) Applicant: Synopsys, Inc., Mountain View, CA (US)

(72) Inventors: Shaori Guo, Mountain View, CA (US); Jun Cao, Mountain View, CA (US); Fei Ren, Mountain View, CA (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 16/266,922

(22) Filed: Feb. 4, 2019

Related U.S. Application Data (60) Provisional application No. 62/626,962, filed on Feb. 6, 2018.

(51) Int. Cl.
  *G06F 13/38* (2006.01)
  *G06F 13/42* (2006.01)
  *G06F 13/40* (2006.01)

(52) U.S. Cl.
  CPC ........ *G06F 13/387* (2013.01); *G06F 13/4031* (2013.01); *G06F 13/4059* (2013.01); *G06F 13/42* (2013.01)

(58) Field of Classification Search
  CPC .............. G06F 13/387; G06F 13/4031; G06F 13/4059; G06F 3/42; G06F 13/42
  See application file for complete search history.

(56) References Cited

U.S. PATENT DOCUMENTS

| | | | | |
|---|---|---|---|---|
| 2006/0230218 A1* | 10/2006 | Warren | .................. | G06F 3/0607 710/315 |
| 2009/0316718 A1* | 12/2009 | Traeber | ............. | H04L 12/40136 370/463 |
| 2010/0183004 A1* | 7/2010 | Kobayashi | ............ | G06F 13/385 370/389 |
| 2011/0231685 A1* | 9/2011 | Huang | .................. | G06F 1/3203 713/321 |
| 2014/0016637 A1* | 1/2014 | Masood | .............. | H04L 12/4013 370/390 |
| 2015/0363349 A1* | 12/2015 | Remple | ................. | G06F 13/426 710/313 |
| 2015/0370305 A1* | 12/2015 | Wietfeldt | .............. | G06F 1/3206 713/320 |
| 2016/0306763 A1* | 10/2016 | Geva | ........................ | G06F 13/36 |
| 2017/0161226 A1* | 6/2017 | Gerber | ................ | G06F 13/4282 |
| 2019/0034377 A1* | 1/2019 | Chen | .................... | G06F 13/4282 |

\* cited by examiner

*Primary Examiner* — Tim T Vo
*Assistant Examiner* — Phong H Dang
(74) *Attorney, Agent, or Firm* — Alston & Bird LLP (57) ABSTRACT

Various embodiments are directed to a USB hub configured for supporting multiple data transfer speed protocols. The USB hub comprises a plurality of protocol/LINK layer components; and a physical layer component shared among the plurality of protocol/LINK layer components and supporting at least two USB connection ports. The physical layer component is in communication with each of the plurality of protocol/LINK layer components. A buffer system (including RX/TX buffers) is shared among the plurality of protocol/LINK layer components and a USB host controller component is in communication with the buffer system. The physical layer component is configured for operating in a first mode to support one of the at least two USB ports in a first operating mode; and operating in a second mode to support the at least two USB ports in a second operating mode.

15 Claims, 4 Drawing Sheets

FIG. 1

PRIOR ART

METHOD AND APPARATUS FOR INCREASING THE NUMBER OF USB ROOT HUB PORTS

CROSS-REFERENCE TO RELATED APPLICATIONS

This patent application claims priority from U.S. Provisional Appl. Ser. No. 62/626,962, filed Feb. 6, 2018, which is incorporated herein by reference in its entirety.

BACKGROUND—DISCLAIMER

In the following Background, Summary, and Detailed Description, headings should not be construed as necessarily limiting. In the following Background, Summary and Detailed Description, citation or identification of any publication does not signify relevance or status as prior art for any of the claimed or described embodiments. Paragraphs for which the text is all italicized signifies text that is common to multiple Synopsys patent specifications.

BACKGROUND

In applications of Universal Serial Bus (USB) technology, a USB hub is often used to extend the USB network and allow more USB devices to be connected to the network. The USB hub can be an external hub (physically separate), or a root hub that is directly connected to a USB host controller. Usually, a root hub is preferable to an external hub, as having an external USB hub in the USB network not only adds to the overall system cost, but also increases the physical area occupied by the USB hub.

Through applied effort and ingenuity, the inventors have provided improvements in USB hubs in accordance with the various embodiments discussed herein.

BRIEF SUMMARY

The claims signify a brief description of one or more of the innovations, embodiments, and/or examples found within this disclosure.

Certain embodiments are directed to a USB hub comprising: a plurality of protocol/LINK layer components; one or more physical layer components shared among the plurality of protocol/LINK layer components, wherein the one or more physical layer components are in communication with the plurality of protocol/LINK layer components; at least two connection ports connected with the one or more physical layer component; a buffer system shared among the plurality of protocol/LINK layer components, wherein the buffer system is in communication with the plurality of protocol/LINK layer components; and a USB host controller component configured to interface with an external system; and wherein the one or more physical layer components are each configured for operating in a first mode to support one of the at least two USB ports in a first operating mode; and operating in a second mode to support the at least two USB ports in a second operating mode.

In certain embodiments, the USB hub further comprises a multiplexor connecting the plurality of protocol/LINK layer components and the one or more physical layer components. Moreover, the physical layer component may be configured for serialization and deserialization, wherein the physical layer component may be configured for selection between the first operating mode and the second operating mode, and wherein: when operating in the first operating mode, the physical layer component is configured for supporting a single USB port at a first data transfer speed; and when operating in the second operating mode; the physical layer component is configured for supporting multiple USB operating ports each operating at a second data transfer speed.

In certain embodiments, the first data transfer speed is faster than the second data transfer speed. Moreover, the plurality of protocol/LINK layer components may comprise: a first protocol/LINK layer component configured for supporting the physical layer component while the physical layer component is operating in the first operating mode; and a second protocol/LINK layer component configured for supporting the physical layer component while the physical layer component is operating in the second operating mode.

In certain embodiments, the first protocol/LINK layer component comprises a USB3.1 protocol/LINK layer component and the second protocol/LINK layer component comprises a USB3.2 protocol/LINK layer component. In various embodiments, the buffer system is configured for operation to support USB operating ports operating at either the first data transfer speed or the second data transfer speed. Moreover, in certain embodiments, the USB hub further comprises a user interface element configured for receiving a user selection of the first operating mode or the second operating mode; and wherein the physical layer is configured to switch between the first operating mode and the second operating mode based on user input received via the user interface element.

Certain embodiments are directed to a PHY component for serialization and deserialization (SERDES) within a USB hub, wherein the PHY component is configured for selection between a first operating mode and a second operating mode, and wherein: when operating in the first operating mode, the PHY component is configured for supporting a single USB port at a first data transfer speed; and when operating in the second operating mode; the PHY component is configured for supporting multiple USB operating ports each operating at a second data transfer speed.

In various embodiments, the PHY component is further configured for: communicating with a first protocol/LINK layer component of a USB hub when operating in the first operating mode; and communicating with a second protocol/LINK layer component of the USB hub when operating in the second operating mode.

In certain embodiments, the first data transfer speed is faster than the second data transfer speed. Moreover, the PHY component may be further configured to switch between the first operating mode and the second operating mode based at least in part on user input received via a user interface element.

Certain embodiments are directed to a method for operating a USB hub. In various embodiments, the method comprises: receiving a selection of an operating mode for the USB hub, wherein the operating mode is selected from a first mode and a second mode; configuring a physical layer component of the USB hub to support the selected operating mode; and transferring data across one or more USB ports of the USB hub in accordance with the selected operating mode; and wherein when operating in the first operating mode, data is transferred across a first protocol/LINK layer component at a first data transfer speed; and when operating in the second operating mode, data is transferred across a second protocol/LINK layer component at a second data transfer speed.

In various embodiments, the method further comprises transferring data across a buffer system in communication with both the first protocol/LINK layer component and the second protocol/LINK layer component. In certain embodiments, the method further comprises transferring data across a multiplexor in communication between the physical layer component and each of the first protocol/LINK layer component and the second protocol/LINK layer component.

In certain embodiments, the method further comprises transferring data across a USB host controller in communication with the buffer system. Moreover, the first operating mode may be configured to support data transfer across a first quantity of USB ports; and the second operating mode may be configured to support data transfer across a second quantity of USB ports, wherein the second quantity of USB ports is greater than the first quantity of USB ports. In certain embodiments, the second data transfer speed is slower than the first data transfer speed.

This Summary does not attempt to provide the complete significance of any particular innovation, embodiment, or example as it can be used in commerce. Additionally, this Summary is not intended to signify key or critical elements of an innovation, embodiment or example or to limit the scope of the subject matter of this disclosure.

The innovations, embodiments, and/or examples found within this disclosure are not all-inclusive, but rather describe the basic significance of the subject matter. Accordingly, one use of this Summary is as a prelude to a Detailed Description presented later.

BRIEF DESCRIPTION OF THE SEVERAL VIEWS OF THE DRAWINGS

The following Detailed Description, Figures and appended claims signify the nature and advantages of the innovations, embodiments and/or examples of the claimed inventions. All of the Figures signify innovations, embodiments, and/or examples of the claimed inventions for purposes of illustration only and do not limit the scope of the claimed inventions. Such Figures are not necessarily drawn to scale, and are part of the Disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

A USB hub comprises one or more downstream ports (e.g., a physical socket/plug, schematically depicted in L1, L2, L3 and L4 in FIG. 1). Each downstream port is configured for connection with one USB device (e.g., connecting a smartphone to a computer via a USB cable) or one additional multi-port USB hub to be connected. The larger the number of downstream ports, the more devices or hubs can be connected.

DETAILED DESCRIPTION

The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to provide a thorough understanding of one or more of the exemplary innovations, embodiments and/or examples. In the interest of not obscuring the presentation of the exemplary innovations, embodiments and/or examples in the following Detailed Description, some processing steps or operations that are known in the art may have been combined together for presentation and for illustration purposes and might not be described in detail. However, a person skilled in the art will recognize that these exemplary innovations, embodiments and/or examples may be used in commerce without these specific details or with equivalents thereof. In other instances, well-known processes and devices are not described in detail as not to unnecessarily obscure aspects of these exemplary innovations, embodiments and/or examples. In other instances, some processing steps or operations that are known in the art may not be described at all. The following description is instead focused on the distinctive features or elements of various exemplary innovations, embodiments and/or examples. Furthermore, while this description may refer to some components of the structure in the singular tense, more than one component may be depicted throughout the Figures and like components are labeled with like numerals.

Figure 1:
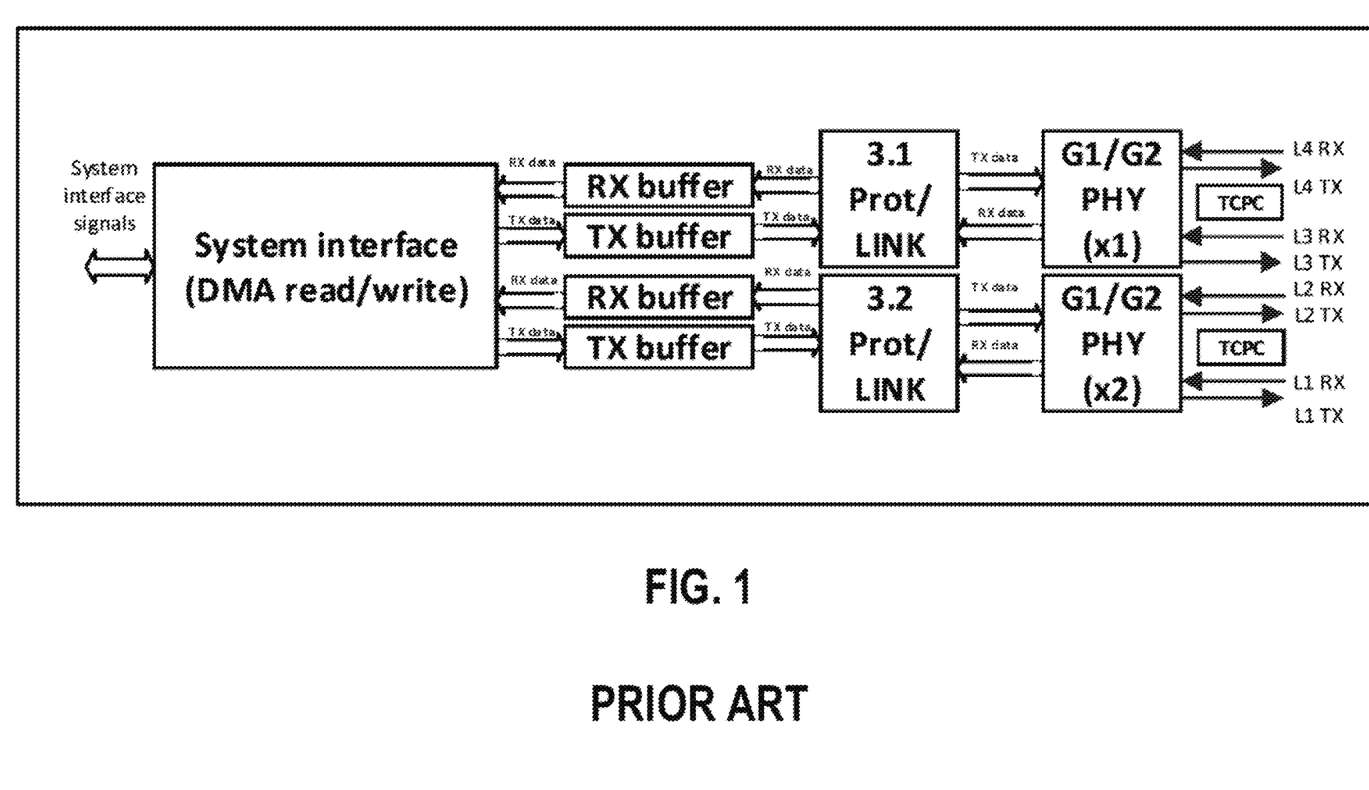
FIG. 1 depicts a conventional USB host controller that supports 2 USB3.1 root hub ports and 1 USB3.2 root hub port.

As used herein, the term "USB port" signifies physical links (sockets, plugs e.g., L1, L2, L3 and L4 in FIG. 1).

As used herein, the term "USB port structure" signifies these physical links, plus the associated SERDES/PHY component connected to the physical links (e.g., G1/G2 PHYs in FIG. 1). Such components may comprise one or more subcomponents such as specific conductors, semiconductors, logic controllers, and/or the like that collectively perform the functions of a particular component.

FIG. 1 shows a simplified block diagram of a USB host controller embodied within a USB hub. For clarity, only the components of the USB host controller related to the embodiments disclosed herein are shown, and other components such as event handling, xHCI command handling, scheduling etc., are deliberately omitted.

The USB hub host controller of FIG. 1 provides two USB port structures: the first being one USB3.2 root port using the G1/G2 PHY (x2) component; and the second being two USB3.1 root ports using the G1/G2 PHY(x1) component plus using the G1/G2 PHY(x2) component configured to act as a G1/G2 PHY(x1) component.

The PHY components are one type of Serialization and De-serialization (SERDES) circuitry.

G1/G2 PHY (x1) is a physical layer function component (PHY) for the USB3.1 Gen1/Gen2 root hub, and G1/G2 PHY (x2) is a PHY for the USB3.2 root hub. The two TCPC components are the type-C port controllers, each for a USB3.1 root hub port and a USB3.2 root hub port respectively. The USB3.1 Prot/LINK is the protocol-layer and link-layer function component for USB3.1, and the USB3.2 prot/LINK is the protocol-layer and link-layer component for USB3.2. The RX buffers are internal memories for temporarily storing the received data before they are written to the system memory using the DMA write engine via the system interface. Similarly, the TX buffers are internal memories for temporarily storing the data read from the system memory using the DMA read engine via the system interface. Collectively, an RX buffer component and a TX buffer component constitute a buffer system within a USB hub.

More specifically, to operate as one USB3.2 root hub port with two USB ports, the host controller enables the G1/G2 PHY (x2) component, the USB3.2 Prot/LINK, the lower buffer system (the lower RX/TX buffer pairs (L1, L2)), and the System interface (DMA read/write), while disabling the upper buffer system (the upper RX/TX buffer pairs (L3, L4)), USB3.1 Prot/LINK, and G1/G2 PHY (x1).

For a USB host controller, doubling the number of downstream USB ports often means a significant increase of its size, and hence the cost. This is because that a dedicated SERDES component, for example a physical-layer function (PHY in short) component, may be required for every additional root hub port structure. As the USB data rate increases, so does the complexity of the PHY. And as the PHY complexity increases, so does its size.

Furthermore, the majority of the design of the USB PHY component comprises analog circuitry. Unlike its digital counterpart, analogy circuitry does not scale well with silicon geometry. As a result, the size of the PHY increasingly dominates the total area of the USB host controller, especially as industry moves from USB2 to USB3.1, and from USB3.1 to USB3.2, and as the technology process moves from 28 nm to 16 nm, and from 16 nm to 7 nm etc.

In some of the embodiments disclosed herein, a method and apparatus is disclosed that increases the number of USB ports provided by a USB host controller without increasing the number of G1/G2 PHY (x2) components, while keeping the host controller cost almost unchanged.

In some of the embodiments disclosed herein, a USB3.2 host controller with one USB port that uses one G1/G2 PHY (x2) component, can also be configured to act as a USB3.1 host controller with two USB ports while using just one G1/G2 PHY (x2) component.

Likewise, a dual USB3.2 host controller, with two G1/G2 PHY (x2) components, can be configured to act as a USB3.1 host controller with four USB ports, etc.

Some of the embodiments disclosed herein are based on the discovery that if a USB3.2 downstream port structure has two physical layer (PHY) functions, each can serve as a USB3.1 downstream physical layer. By introducing proper data path multiplexing, and adding a type-C port controller and a USB3.1 protocol layer and link layer functions, a host controller with one USB3.2 downstream port structure can function as two USB3.1 downstream ports.

Figure 2:
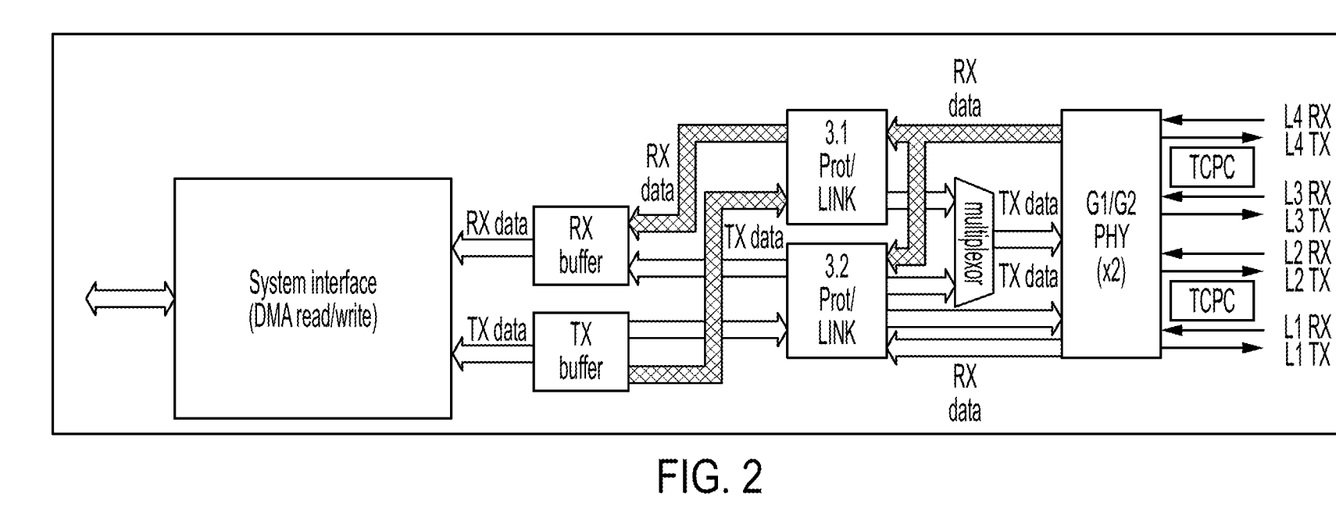
FIG. 2 depicts a USB host controller that supports 2 USB3.1 root hub ports and 1 USB3.2 root hub port in accordance with various disclosed embodiments.

FIG. 2 shows a block diagram of the host controller with two USB3.1 port structures and one USB3.2 port structure that, instead of using two PHYs components, only uses one G1/G2 PHY (x2) component. To operate as two independent USB3.1 port structures supporting four USB ports, two type-C port controllers (TCPC) are used. When operating as a USB3.2 port structure, only one TCPC is used.

Also, as both the USB3.1 Prot/LINK component and the USB3.2 Prot/LINK component operate at 10 gigabits per second data throughput, shared buffer system (the RX/TX) buffers that are designed to handle 20 gigabits per second data throughput may be shared therebetween. A multiplexor, between the Prot/LINK components and the PHY component (seen in FIG. 2), may be used to select buffer system data paths (RX/TX data paths), depending on whether the host operates as two root ports or one root port. The remaining components may have a configuration analogous to that shown in FIG. 1.

To operate as a single USB3.2 port structure, the host controller disables the USB3.1 Prot/LINK component, and configures the multiplexor to select the buffer system data paths (RX/TX data paths) associated with the USB3.2 Prot/LINK component. Connection circuitry associated with all four physical ports (L1, L2, L3, L4 "two lanes") are used with a single port to allow the hub to support 20 gigabits per second of data flow.

To operate as two USB3.1 port structures, the host controller turns on both the USB3.1 Prot/LINK and USB3.2 Prot/LINK components, and configures the multiplexor to select buffer system data paths (RX/TX data paths) from both the USB3.1 Prot/LINK and USB3.2 Prot/Link components. In these instances, connection circuitry associated with the four physical ports (L1, L2, L3, L4) are used with two ports to allow the hub to support two data flows at 10 gigabits per second.

In some of the embodiments disclosed herein, the USB host controller can comprise multiple USB3.2 port structures. The number of hub ports is doubled when the host controller switches the G1/G2 PHY (x2) component to operate in USB3.1 mode. It should be understood that the operating mode (selected between the USB3.1 and USB3.2 operating modes) may be identified during manufacturing of the USB hub (e.g., the operating mode may be permanently set for a particular USB hub and selected from the two available operating modes, while utilizing identical hardware), may be identified based on software input (e.g., provided from a connected USB device/computing device through which a user may select a particular operating mode), or in response to a physical switch actuation on the USB hub itself. In the latter two configurations, a user of the USB hub may select a desired operating mode of the USB hub (either through software-based user input or hardware based user input).

Figure 3:
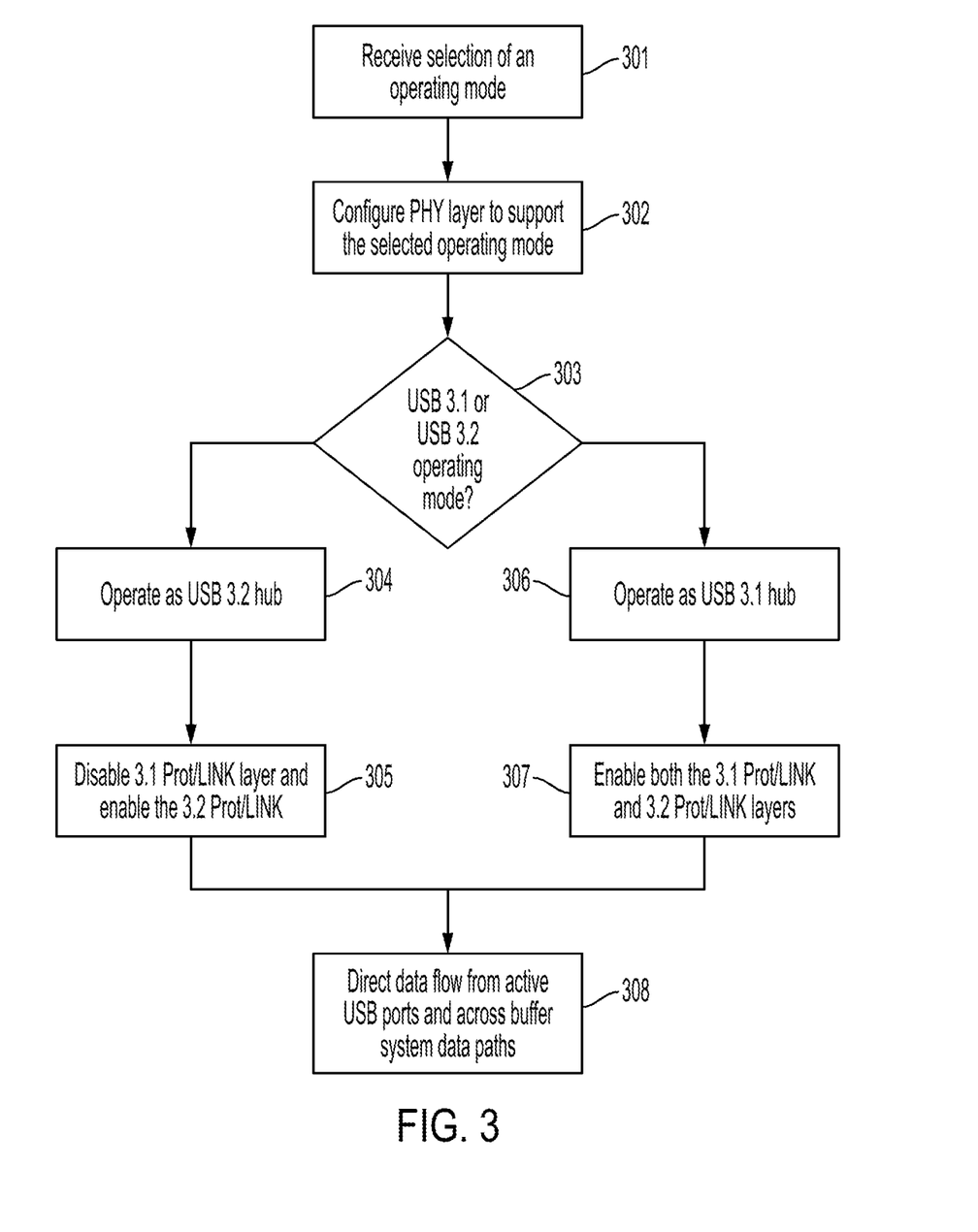
FIG. 3 is a flowchart illustrating operations of a USB hub in accordance with various embodiments.

A USB having a host controller as discussed herein with reference to FIG. 2 may be operated in accordance with the method illustrated in the flowchart of FIG. 3. As shown therein, the USB hub may, in certain embodiments, receive a selection of an operating mode for the USB hub as shown at Block 301. The operating mode, which is indicative of the number of USB ports to be utilized and the USB connection protocol utilized (e.g., a USB3.1 or USB3.2 operating mode, configured to operate with corresponding root hub structures, respectively), may be selected via a physical switch on the USB hub itself, via manual input provided by a USB device connected via a USB port (or a connected computing entity). Alternatively, the operating mode for the USB hub may be selected during initial manufacturing of the USB hub, which may be configured thereafter for operating via the operating mode selected at the time of manufacturing.

The USB hub configures a PHY layer of the USB hub to support the selected operating mode (as shown at Block 302) upon determining the selected operating mode (as shown at decision Block 303). For example, for operating within a USB3.2 operating mode (as shown at Block 304), (thereby operating as a single USB3.2 port structure), the host controller disables the USB3.1 Prot/LINK component as shown at Block 305, and configures the multiplexor to select the buffer system data paths (RX/TX data paths) associated with the USB3.2 Prot/LINK component to direct the data flow from the connected USB ports and across the buffer system data paths, as shown at Block 308. Connection circuitry associated with all four physical ports (L1, L2, L3, L4 "two lanes") are used with a single port to allow the hub to support 20 gigabits per second of data flow.

To operate in a USB3.1 operating mode as shown at Block 306 (thereby operating as two USB3.1 port structures), the host controller turns on both the USB3.1 Prot/LINK and USB3.2 Prot/LINK components (as shown at Block 307), and configures the multiplexor to select buffer system data paths (RX/TX data paths) from both the USB3.1 Prot/LINK and USB3.2 Prot/Link components. In these instances, connection circuitry associated with the four physical ports (L1, L2, L3, L4) are used with two ports to allow the hub to support two data flows at 10 gigabits per second.

The USB hub then transfers data across the operating USB ports in accordance with the selected operating mode and the data transfer speed of the corresponding operating mode.

Technology Support General Computer Explanation

Figure 4A:
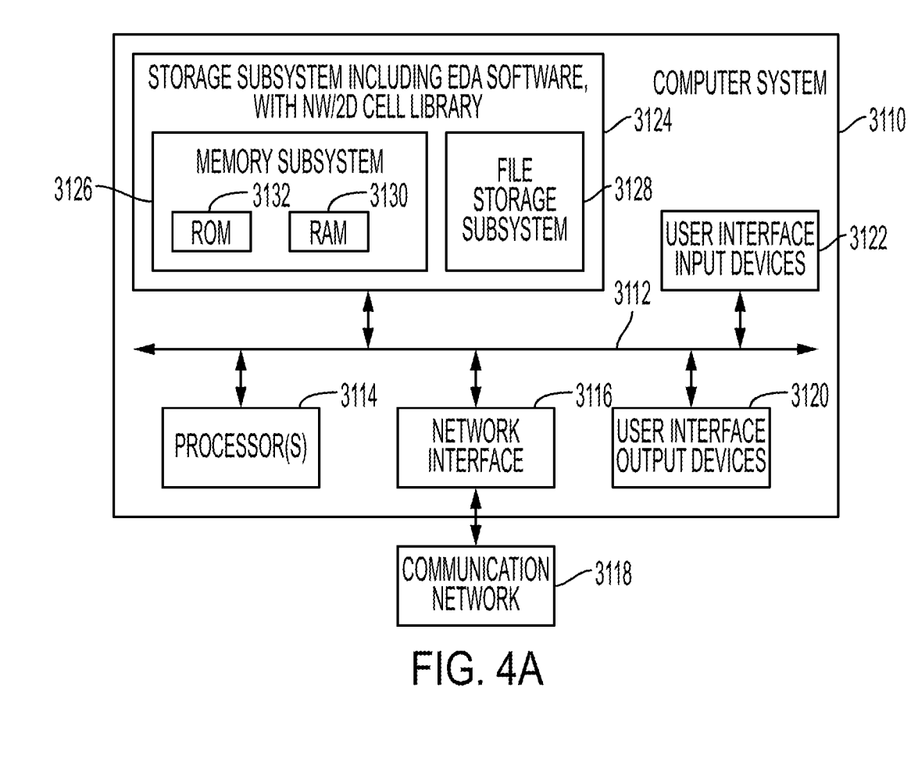
FIGS. 4A, 4B and 4C are simplified block diagrams of a computer system suitable for use with embodiments of the technology, as well as circuit design and circuit embodiments of the technology. In such various figures, reference signs may be omitted as is consistent with accepted engineering practice; however, one of ordinary skill in the art will understand that the illustrated components are readily understood when viewed in context of the illustration as a whole and the accompanying disclosure describing such various figures.
Figure 4B:
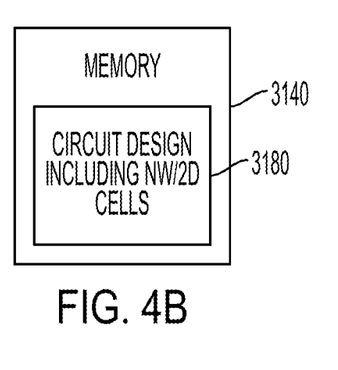
Figure 4C:
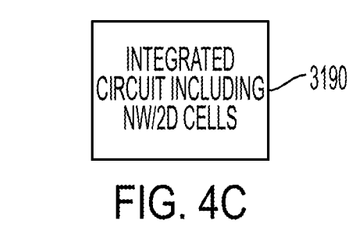

FIGS. 4A, 4B and 4C are simplified block diagrams of a computer system suitable for use with embodiments of the technology, as well as circuit design and circuit embodiments of the technology.

Computer system 3110 typically includes at least one computer or processor 3114 which communicates with a number of peripheral devices via bus subsystem 3112. Typically, the computer can include, or the processor can be, any of a microprocessor, graphics processing unit, or digital signal processor, and their electronic processing equivalents, such as an Application Specific Integrated Circuit (ASIC) or Field Programmable Gate Array (FPGA). The terms 'processor' and 'computer' are further defined below. These peripheral devices may include a storage subsystem 3124, comprising a memory subsystem 3126 and a file storage subsystem 3128, user interface input devices 3122, user interface output devices 3120, and a network interface subsystem 3116. The input and output devices allow user interaction with computer system 3110.

The computer system may be a server computer, a client computer, a workstation, a mainframe, a personal computer (PC), a tablet PC, a set-top box (STB), a personal digital assistant (PDA), a cellular telephone, a smartphone, a web appliance, a kiosk, a television, a game station, a network router, switch or bridge, or any data processing machine capable of executing instructions 124 (sequential or otherwise) that specify actions to be taken by that machine. The computer system typically includes an operating system, such as Microsoft's Windows, Apple Computer's Mac OS, Linux or Unix.

Innovations, embodiments and/or examples of the claimed inventions are neither limited to conventional computer applications nor the programmable apparatus that run them. For example, the innovations, embodiments and/or examples of the claimed inventions can include an optical computer, quantum computer, analog computer, or the like. The computer system may be a multi-processor or multi-core system and may use or be implemented in a distributed or remote system. The term 'processor' here is used in the broadest sense to include a singular processor and multi-core or multiprocessor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions 124 to perform any one or more of the sets of instructions discussed herein. Due to the ever-changing nature of computers and networks, the description of computer system 3110 depicted in FIG. 4A is intended only as one example for purposes of illustrating the preferred embodiments. Many other configurations of computer system 3110 are possible having more or less components than the computer system depicted in FIG. 4A.

Network interface subsystem 3116 provides an interface to outside networks, including an interface to communication network 3118, and is coupled via communication network 3118 to corresponding interface devices in other computer systems or machines. Communication network 3118 may comprise many interconnected computer systems, machines and communication links. These communication links may be wireline links, optical links, wireless links, or any other devices for communication of information. Communication network 3118 can be any suitable computer network, for example a wide area network such as the Internet, and/or a local area network such as Ethernet. The communication network can be wired and/or wireless, and the communication network can use encryption and decryption methods, such as is available with a virtual private network.

User interface input devices 3122 may include an alphanumeric keyboard, pointing devices such as a mouse, trackball, touchpad, stylus, or graphics tablet, a scanner, a touchscreen incorporated into the display, audio input devices such as voice recognition systems, microphones, and other types of input devices. In general, use of the term "input device" is intended to include all possible types of devices and ways to input information into computer system 3110 or onto communication network 3118.

User interface output devices 3120 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from computer system 3110 to the user or to another machine or computer system.

Memory subsystem 3126 typically includes a number of memories including a main random-access memory (RAM) 3130 (or other volatile storage device) for storage of instructions and data during program execution and a read only memory (ROM) 3132 in which fixed instructions are stored. File storage subsystem 3128 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 3128.

Bus subsystem 3112 provides a device for letting the various components and subsystems of computer system 3110 communicate with each other as intended. Although bus subsystem 3112 is shown schematically as a single bus, alternative embodiments of the bus subsystem may use multiple busses. For example, RAM-based main memory can communicate directly with file storage systems using Direct Memory Access (DMA) systems.

FIG. 4B shows a memory 3140 such as a non-transitory, computer readable data and information storage medium associated with file storage subsystem 3128, and/or with network interface subsystem 3116, and can include a data structure specifying a circuit design. The memory 3140 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 4C is a block representing an integrated circuit 3190 created with the described technology that includes one or more cells selected, for example, from a cell library.

Technology Support Hardware/Software Equivalence

Some of the innovations, embodiments and/or examples described herein comprise and/or use a processor. As used herein, the term 'processor' signifies a tangible data and information processing device that physically transforms data and information, typically using a sequence transformations (also referred to as 'operations'). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For data and information structured in binary form, any processor that can transform the data and information using the AND, OR and NOT logical operations (and their derivatives, such as the NAND, NOR, and XOR operations) can transform the data and information using any function of Boolean logic. A processor such as an analog neural network processor can also transform data and information non-digitally. There is no scientific evidence that any of these processors are processing, storing and retrieving data and information, in any manner or form equivalent to the bioelectric structure of the human brain.

The one or more processors may also operate to support performance of the relevant operations in a 'cloud computing' environment or as a 'software as a service' (SaaS). For example, at least some of the operations may be performed by a group of processors available at a distributed or remote system, these processors accessible via a communications network (e.g., the Internet) and via one or more software interfaces (e.g., an application program interface (API)).

As used herein, the term 'module' signifies a tangible data and information processing device, that typically is limited in size and/or complexity. For example, the term 'module' can signify one or more methods or procedures that can transform data and information. The term 'module' can also signify a combination of one or more methods and procedures in a computer program. The term 'module' can also signify a small network of digital logic devices, in which interconnections of the logic devices give structure to the network. Methods and procedures comprising a module, specified in a specialized language, such as System C, can be used to generate a specification for a network of digital logic devices that process data and information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs for example, sold by Xilink or Intel's Altera), Random Access Memories (RAMs) or microprocessors. A module is configured to process data and information, typically using a sequence transformations (also referred to as 'operations') applied to the data and information (or in the case of ROMs and RAMS, transforming data and information by using the input information as an address for memory that stores output data and information), to perform aspects of the present innovations, embodiments and/or examples of the invention.

Modules that are temporarily configured need not be configured at any one instance in time. For example, a processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term 'algorithm' signifies a sequence or set of operations or instructions that a module can use to transform data and information to achieve a result. A module can comprise one or more algorithms.

As used herein, the term 'computer' includes at least one information processor that, for example, can perform certain operations such as (but not limited to) the AND, OR and NOT logical operations using electronic gates that can comprise transistors, with the addition of memory (for example, memory based on flip flops using the NOT-AND or NOT-OR operation). Such a processor is said to be Turing-complete or computationally universal. A computer, whether or not it is a digital computer, typically comprises many modules.

As used herein, the term 'software' or 'program' signifies one or more algorithms and data structures that configure a processor for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of data and instructions that configure the processor to achieve a specific result, for example, to perform word processing operations, or to encrypt a set of data.

As used herein, the term 'programming language' signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C-i--i- or the like, and any future equivalent programming languages.

Software is entered into, equivalently, read into, one or memories of the computer or computer system from a data and information storage device. The computer typically has a device for reading storage media that is used to transport the software, or has an interface device that receives the software over a network. This process is discussed in the General Computer Explanation section.

Semantic Support

The signifier 'commercial solution' signifies, solely for the following paragraph, an engineering domain-specific (and thus non-preemptive see Bilski) electronic structure, process for specified machines, manufacturable circuit (and their Church-Turing equivalents) or composition of matter that is useful in commerce to solve a problem of technology, that is, a use in commerce of an application of science or use in commerce of technology.

The signifier 'abstract' (when used in a patent claim for any embodiments disclosed herein for a new commercial solution that is a scientific application of one or more laws of nature {see Benson}, and that solves a problem of technology {see Diehr} used in commerce—or improves upon an existing commercial solution {see Diehr})—is precisely defined by the inventor(s) {see MPEP 2111.01} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is "difficult to understand" {see Merriam-Webster definition for 'abstract'} how the commercial solution differs from equivalent prior art solutions; or b) a new commercial solution is 'abstract' if it is obvious, that is, if the existing prior art includes at least one analogous prior art solution {see KSR}, or the existing prior art includes at least two prior art items that can be combined {see Alice} by a person having ordinary skill in the art {a "PHOSITA", see MPEP 2141-2144} to be equivalent to the new commercial solution, and is thus unpatentable under 35 U.S.C. 103, for example, because it is "difficult to understand" how the new commercial solution differs from a PHOSITA-combination/-application of the existing prior art; or c) a new commercial solution is 'abstract' if it is not disclosed with an enabling description either because there is insufficient guidance in the enabling description, or because only a generic implementation is described {see Mayo} with unspecified elements, parameters or functionality, so that a PHOSITA is unable to instantiate a useful embodiment of the new commercial solution, without, for example, requiring special programming {see Katz} or circuit design to be performed by the PHOSITA), and is thus unpatentable under 35 U.S.C. 112, for example, because it is "difficult to understand" how to use in commerce any embodiment of the new commercial solution.

CONCLUSION

The foregoing Detailed Description signifies in isolation the individual features, structures, functions, or characteristics described herein and any combination of two or more such features, structures, functions or characteristics, to the extent that such features, structures, functions or characteristics or combinations thereof are based on the present specification as a whole in light of the knowledge of a person skilled in the art, irrespective of whether such features, structures, functions or characteristics, or combinations thereof, solve any problems disclosed herein, and without limitation to the scope of the claims. When an embodiment of a claimed invention comprises a particular feature, structure, function or characteristic, it is within the knowledge of a person skilled in the art to use such feature, structure, function, or characteristic in connection with other embodiments whether or not explicitly described, for example, as a substitute for another feature, structure, function or characteristic.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein were chosen and described to signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

That which is claimed:

1. A USB hub comprising:
one or more physical layer components;
a plurality of protocol/LINK layer components comprising:
a first protocol/LINK layer component configured for supporting the one or more physical layer components while the one or more physical layer components are operating in an operating mode selected from: a first operating mode and a second operating mode; and
a second protocol/LINK layer component configured for supporting the one or more physical layer components while the one or more physical layer components are operating in the second operating mode; and
at least two USB connection ports connected with the one or more physical layer components;
and
wherein the one or more physical layer components are each configured for operating in a first mode to support one of the at least two USB connection ports in the first operating mode, wherein the first operating mode corresponds with activation of the first protocol/LINK layer component; and operating in a second mode to support the at least two USB connection ports in the second operating mode, wherein the second operating mode corresponds with activation of both the first protocol/LINK layer component and the second protocol/LINK layer component.

2. The USB hub of claim 1, further comprising a multiplexor connecting the plurality of protocol/LINK layer components and the one or more physical layer components.

3. The USB hub of claim 1, wherein the one or more physical layer components are configured for serialization and deserialization, wherein the one or more physical layer components are configured for selection between the first operating mode and the second operating mode, and wherein:
when operating in the first operating mode, the one or more physical layer components are configured for supporting a single USB port at a first data transfer speed; and
when operating in the second operating mode; the one or more physical layer components are configured for supporting multiple USB operating ports each operating at a second data transfer speed.

4. The USB hub of claim 3, wherein the first data transfer speed is faster than the second data transfer speed.

5. The USB hub of claim 1, wherein the first protocol/LINK layer component comprises a USB3.2 protocol/LINK layer component and the second protocol/LINK layer component comprises a USB3.1 protocol/LINK layer component.

6. The USB hub of claim 3, further comprising a buffer system shared among the plurality of protocol/LINK layer components, wherein the buffer system is in communication with the plurality of protocol/LINK layer components and wherein the buffer system is configured for operation to support USB operating ports operating at either the first data transfer speed or the second data transfer speed.

7. The USB hub of claim 1, further comprising a user interface element configured for receiving a user selection of the first operating mode or the second operating mode; and
wherein the one or more physical layer components are configured to switch between the first operating mode and the second operating mode based on user input received via the user interface element.

8. A PHY component for serialization and deserialization (SERDES) within a USB hub, wherein the PHY component is configured for selection between a first operating mode and a second operating mode, and wherein:
when operating in the first operating mode, the PHY component is configured for supporting a single USB port at a first data transfer speed and communicating with a first protocol/LINK layer component; and
when operating in the second operating mode the PHY component is configured for supporting multiple USB operating ports each operating at a second data transfer speed and communicating with the first protocol/LINK layer component and a second protocol/LINK layer component.

9. The PHY component of claim 8, wherein the first data transfer speed is faster than the second data transfer speed.

10. The PHY component of claim 8, wherein the PHY component is further configured to switch between the first operating mode and the second operating mode based at least in part on user input received via a user interface element.

11. A method for operating a USB hub, the method comprising:
receiving a selection of an operating mode for the USB hub, wherein the operating mode is selected from a first operating mode and a second operating mode, and wherein:
the first operating mode is configured to support data transfer across a first quantity of USB ports; and
the second operating mode is configured to support data transfer across a second quantity of USB ports, wherein the second quantity of USB ports is greater than the first quantity of USB ports;
configuring a physical layer component of the USB hub to support the selected operating mode; and
transferring data across one or more USB ports of the USB hub in accordance with the selected operating mode; and wherein:
when operating in the first operating mode, data is transferred across a first protocol/LINK layer component at a first data transfer speed; and
when operating in the second operating mode, data is transferred across the first protocol/LINK layer component and a second protocol/LINK layer component at a second data transfer speed.

12. The method for operating a USB hub of claim 11, further comprising transferring data across a buffer system in communication with both the first protocol/LINK layer component and the second protocol/LINK layer component.

13. The method for operating a USB hub of claim 12, further comprising transferring data across a multiplexor in communication between the physical layer component and each of the first protocol/LINK layer component and the second protocol/LINK layer component.

14. The method for operating a USB hub of claim 12, further comprising transferring data across a USB host controller in communication with the buffer system.

15. The method for operating a USB hub of claim 11, wherein the second data transfer speed is slower than the first data transfer speed.

\* \* \* \* \*